US009088152B2

(12) United States Patent
Huang

(10) Patent No.: US 9,088,152 B2
(45) Date of Patent: Jul. 21, 2015

(54) LEAKAGE DETECTION PROTECTION CIRCUIT

(76) Inventor: Huadao Huang, Yueqing (CN)

(*) Notice: Subject to any disclaimer, the term of this patent is extended or adjusted under 35 U.S.C. 154(b) by 279 days.

(21) Appl. No.: 13/467,022

(22) Filed: May 8, 2012

(65) Prior Publication Data

US 2012/0287537 A1    Nov. 15, 2012

(30) Foreign Application Priority Data

May 11, 2011  (CN) .......................... 2011 1 0121141
Mar. 23, 2012  (CN) .......................... 2012 1 0081521

(51) Int. Cl.
*H01H 3/04*  (2006.01)
*H02H 3/04*  (2006.01)
*H02H 3/33*  (2006.01)

(52) U.S. Cl.
CPC ........ *H02H 3/04* (2013.01); *H02H 3/335* (2013.01)

(58) Field of Classification Search
CPC ......... H01F 38/32; H01F 27/38; H01F 38/30; H01F 41/0233; H02M 1/36
USPC .................................................. 361/42, 93.1
See application file for complete search history.

(56) References Cited

U.S. PATENT DOCUMENTS

| 5,568,344 | A  | * | 10/1996 | Gernhardt et al. ............. 361/42 |
| 6,738,241 | B1 | * | 5/2004  | Aromin ........................... 361/42 |
| 7,019,952 | B2 | * | 3/2006  | Huang et al. ................... 361/42 |
| 7,639,461 | B2 | * | 12/2009 | DiSalvo et al. ................. 361/42 |
| 8,558,646 | B2 | * | 10/2013 | Li ................................. 335/18 |
| 8,861,146 | B2 | * | 10/2014 | McMahon et al. ............. 361/42 |
| 2004/0004795 | A1 | * | 1/2004 | Chan et al. ..................... 361/42 |
| 2004/0021996 | A1 | * | 2/2004 | Wu et al. ....................... 361/42 |
| 2004/0027740 | A1 | * | 2/2004 | Huang et al. .................. 361/42 |
| 2007/0014068 | A1 | * | 1/2007 | Huang et al. .................. 361/115 |
| 2008/0002313 | A1 | * | 1/2008 | DiSalvo et al. ................ 361/42 |
| 2008/0170341 | A1 | * | 7/2008 | Huang et al. .................. 361/42 |
| 2009/0040667 | A1 | * | 2/2009 | DiSalvo et al. ................ 361/42 |
| 2010/0053826 | A1 | * | 3/2010 | Finlay et al. ................... 361/42 |
| 2010/0073178 | A1 | * | 3/2010 | Huang et al. .................. 340/664 |
| 2011/0242711 | A1 | * | 10/2011 | Morgan et al. ................ 361/42 |
| 2012/0081819 | A1 | * | 4/2012 | Huang ........................... 361/42 |
| 2012/0083142 | A1 | * | 4/2012 | Huang ........................... 439/135 |
| 2012/0149221 | A1 | * | 6/2012 | Huang ........................... 439/137 |
| 2012/0170159 | A1 | * | 7/2012 | Huang ........................... 361/42 |
| 2012/0187958 | A1 | * | 7/2012 | Huang ........................... 324/557 |
| 2012/0287537 | A1 | * | 11/2012 | Huang ........................... 361/42 |
| 2012/0320485 | A1 | * | 12/2012 | Huang ........................... 361/114 |
| 2013/0171847 | A1 | * | 7/2013 | Huang et al. .................. 439/137 |

* cited by examiner

*Primary Examiner* — Thienvu Tran
*Assistant Examiner* — Angela Brooks
(74) *Attorney, Agent, or Firm* — Mei & Mark LLP

(57) ABSTRACT

A leakage detection protection circuit comprises null and live wires in power input and power output ends. Also included are induction coil (L1), self-excitation coil (L2), control chip (IC1), silicon controlled rectifier (V4), rectifier diode (V1), resistor (R1), filter capacitor (C3), trip coil (SOL) with built-in iron core, and main circuit switches (KR2-1, KR2-2) linked with a reset button. At least one single-pole double-throw analog power supply switch (KR-2) is linked with the reset button and comprises a dynamic contact rod (C) and first and second static contact terminals (A) and (B). The analog power supply switch is configured so that the circuit has test analog leakage current, working power supply, or no current based on the position of the dynamic contact rod (C) with respect to the static contact terminals and also based on the position of the reset button.

37 Claims, 8 Drawing Sheets

_US 9,088,152 B2_

LEAKAGE DETECTION PROTECTION CIRCUIT

CROSS-REFERENCE TO RELATED APPLICATION

This application claims priority to and incorporates herein Chinese patent application numbers 201110121141.5, filed on May 11, 2011, and 201210081521.5, filed Mar. 23, 2012.

TECHNICAL FIELD

The present disclosure relates to a leakage detection protection circuit with power saving, simple structure, small size, and abnormal over-voltage protection, which is installed in a power plug or power socket or switch breaker to provide leakage protections.

BACKGROUND

With the continuous industrial development of ground fault circuit interrupters ("GFCI") such as the power socket, power plug and power switch, there are progressively higher requirements for the functions and use-safety, especially for those sold in the US.

The inventor has long committed to the development of the power socket with leakage protections, and in order to meet the market demands, the inventor has improved the leakage detection protection circuit installed in the power plug or power socket or power switch breaker.

SUMMARY

For the above reasons, the present disclosure provides a new leakage detection protection circuit with power saving, simple structure, and small size. The leakage detection protection circuit also provides abnormal over-voltage protection.

The leakage detection protection circuit disclosed by the present teaching comprises: a power input end having a null wire and a live wire; a power output end having a null wire and a live wire; an induction coil installed on the circuit board for detecting leakage current; a self-excitation coil for detecting low-resistance failure; a control chip; a silicon controlled rectifier (SCR); a rectifier diode; a resistor; a filter capacitor; a trip coil with built-in iron core; and main circuit switches linked with a reset button. The leakage detection protection circuit further comprises at least one analog power supply switch, which is linked with the reset button and is a single-pole double-throw switch with a dynamic contact rod, a first static contact terminal, and a second static contact terminal. When the reset button is in a released state, the analog power supply switch is in the switched-off state, the dynamic contact rod will not contact either the first static contact terminal or the second static contact terminal, and the entire leakage detection protection circuit will not carry current. At the moment the reset button is pressed, the analog power supply switch will be switched on, the dynamic contact rod is connected to the power input end or the power input end past the induction coil and the self-excitation coil via the first static contact terminal of the analog power supply switch to form a test circuit and generate analog leakage current. After the reset button is reset, the dynamic contact rod of the analog power supply switch is disconnected from the first static contact terminal, and the analog leakage current will disappear; while the dynamic contact rod of the analog power supply switch is connected to the power output or input end via the second static contact terminal of the analog power supply switch to provide working power supply to the leakage detection protection circuit.

DETAILED DESCRIPTION

Figure 1:
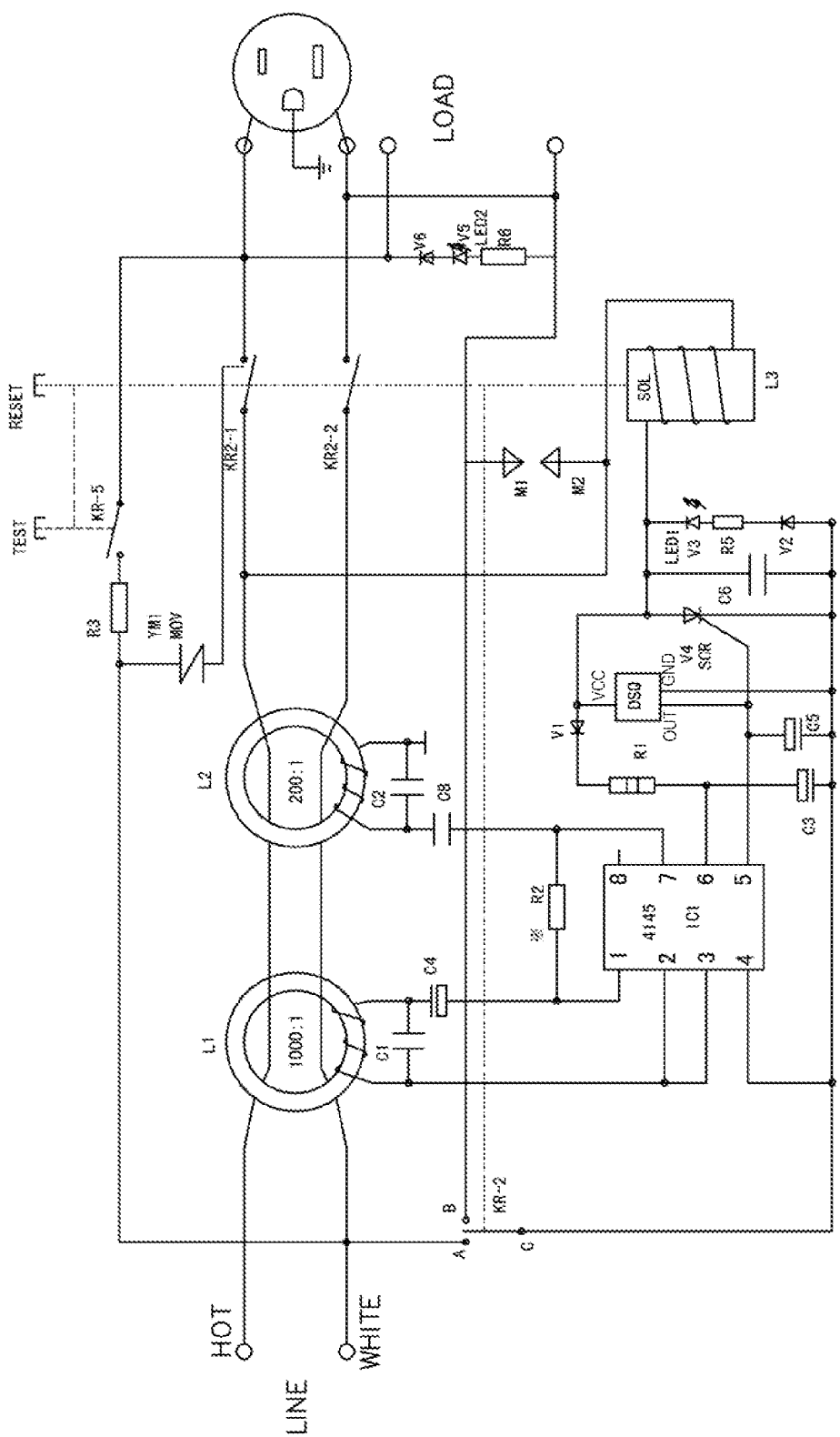
FIG. 1 is a circuit diagram of a leakage detection protection circuit according to the first embodiment.

As shown in FIG. 1, the leakage detection protection circuit comprises: an induction coil L1, installed on a circuit board, for detecting leakage current; a self-excitation coil L2 for detecting low-resistance failure; a control chip IC1 (model RV4145); a SCR (silicon controlled rectifier) V4; a rectifier diode V1; a current limiting resistor R1; a filter capacitor C3; a trip coil SOL with built-in iron core; main circuit switches KR2-1, KR2-2 linked with a reset button; and the test switch KR-5 linked with a test button.

The live, or hot, wire HOT of the power input end LINE passes through the induction coil L1 for detecting leakage current and passes through the self-excitation coil L2 for detecting low resistance failure, and is connected to the live wire output plug bush of the power output jack via the main circuit switch KR2-1 linked with a reset button RESET.

The null, or zero, wire WHITE of the power input end LINE passes through the induction coil L1 for detecting leakage current and passes through the self-excitation coil L2 for detecting low resistance failure, and is connected to the null wire output jack of the power output jack via the main circuit switch KR2-2 linked with the reset button RESET.

The live wire of the power output end LOAD is connected to the live wire output plug bush of the power output jack directly or through a conducting wire, and the null wire of the power output end LOAD is connected to the null wire output plug bush of the power output jack directly or through a conducting wire.

The signal output terminals of the induction coil L1 for detecting leakage current and the self-excitation coil L2 for detecting low-resistance failure are connected to detection signal input pins 1, 2, 3 and 7 of the control chip IC1, and the control signal output pin 5 of the control chip IC1 is connected to the control pole of the SCR V4 to send trigger signals to control the on and off of the SCR V4. Also, the control pole of the SCR V4 is further connected to the control signal output terminal OUT of a timer chip DSQ, which sends trigger signals at predetermined intervals, so that the SCR V4 is turned on to detect whether the leakage detection protection circuit can work properly.

Figure 2:
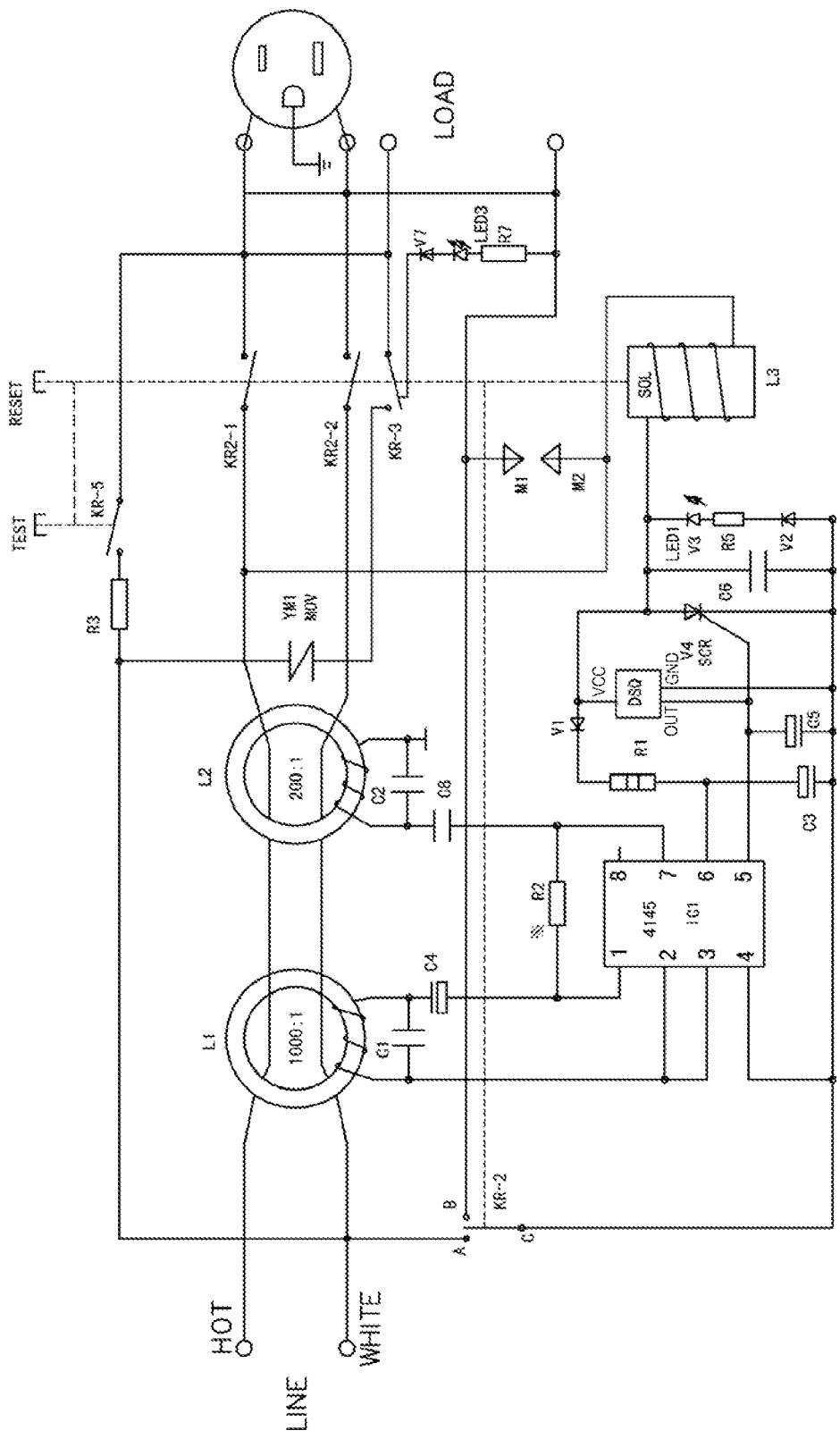
FIG. 2 is a circuit diagram of a leakage detection protection circuit according to the second embodiment.
Figure 3:
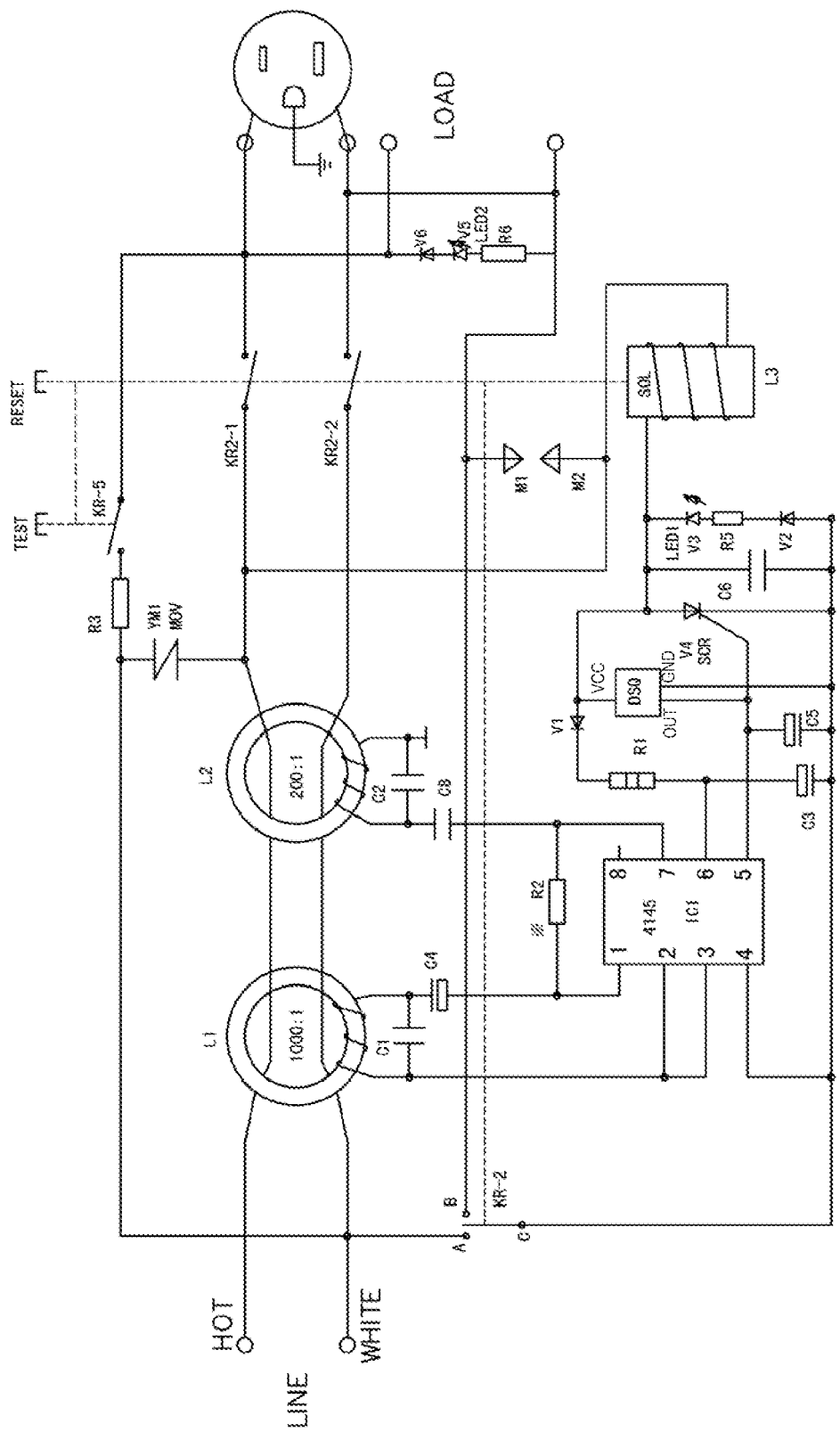
FIG. 3 is a circuit diagram of a leakage detection protection circuit according to the third embodiment.

As shown in FIGS. 1, 2, and 3, the leakage detection protection circuit further comprises at least one analog power supply switch KR-2 linked with a reset button. When the reset button RESET is in the release state, the analog power supply switch KR-2 is in the switched-off state, and the entire leakage detection protection circuit will not carry current, which not only saves electrical energy but also extends the service life of the electric elements. When the reset button RESET is pressed, the analog power supply switch KR-2 is switched on, which not only provides working power supply to the leakage detection protection circuit, but also automatically generates analog leakage current for automatic detection of whether the leakage detection protection circuit can work properly. That is, at reset, the device automatically detects whether the leakage detection protection circuit is already at the end of its service life. After the reset button is reset, the analog power supply switch KR-2 switches to another state, and the analog leakage current will terminate and disappear; however, the analog power supply switch KR-2 is still in the switched-on state to provide working power supply to the entire analog leakage current detection protection circuit.

As the analog power supply switch KR-2 of the leakage detection protection circuit has dual functions, the analog power supply switch takes place of two switches: the analog leakage current generating switch and power supply switch in the existing prior art leakage protection circuit. The presently disclosed circuit will be simpler, with greatly reduced size, decreased cost, and enhanced market competitiveness.

As shown in FIG. 1, the analog power supply switch KR-2 is a single-pole double-throw switch. The first static contact terminal A is connected to the null wire WHITE of the power input end LINE; the second static contact terminal B is connected to the null wire WHITE of the power output end LOAD; and the dynamic contact rod C is connected to the ground output pin 4 of the control chip IC1 and the cathode of the SCR V4.

The power input pin 6 of the control chip IC1 is connected to the live wire HOT of the power input end LINE past the induction coil L1 and the self-excitation coil L2 via the current-limiting resistor R1, the rectifier diode V1, and the trip coil SOL.

The anode of the SCR V4 is connected to the live wire HOT of the power input end LINE past the induction coil L1 and the self-excitation coil L2 via the trip coil SOL.

The power input pin VCC of the timer chip DSQ is connected to the live wire HOT of the power input end LINE past the induction coil L1 and the self-excitation coil L2 via the trip coil SOL. The ground output pin GND of the timer chip DSQ is connected to the dynamic contact rod C of the analog power supply switch KR-2.

When the reset button RESET is in the release state, the analog power supply switch KR-2 is in the switched-off state, the dynamic contact rod C will not contact either the first static contact terminal A or the second static contact terminal B, none of the control chip IC1, the SCR V4, the trip coil SOL, the resistor, the capacitor, and other components in the leakage detection protection circuit is electrically charged, and the entire leakage detection protection circuit will not carry current and is in the power-saving state. This design makes the leakage detection protection circuit more in line with the design requirements for energy saving and environmental protection, and saves electrical energy; moreover, when the leakage detection protection circuit is not working, none of the control chip IC1, the SCR V4, the trip coil SOL, the resistor, the capacitor, and other components in the leakage detection protection circuit is electrically charged, the components are, therefore, more anti-aging, extending the service life of the components and the entire circuit.

When the reset button RESET is pressed, the analog power supply switch KR-2 links with the reset button RESET, the first static contact terminal A of the analog power supply switch KR-2 contacts the dynamic contact rod C, the analog power supply switch KR-2 will be switched on, and the live wire HOT of the power input end LINE past the induction coil L1 and the self-excitation coil L2 is connected to the null wire WHITE of the power input end LINE via the trip coil SOL, the LED1, the resistor R5, the diode V2, and the switched-on analog power supply switch KR-2 to form a closed circuit and generate the analog leakage current.

In the meanwhile, the live wire HOT of the power input end LINE past the induction coil L1 and the self-excitation coil L2 is connected to the null wire WHITE of the power input end LINE via the trip coil SOL, the SCR V4, and the switched-on analog power supply switch KR-2 to provide working power supply to the control chip IC1, the SCR V4, the rectifier diode V1, the resistor R1, the filter capacitor C3, and the trip coil SOL with built-in iron core, and the leakage detection protection circuit will carry current.

If the leakage detection protection circuit is not at the end of its service life and is still having the function of leakage protection, due to the analog leakage current generated in the power supply circuit, the induction coil L1 and the self-excitation coil L2 will send inducted signals to the control chip IC1, and the pin 5 of the control chip IC1 will send control signals so that the SCR V4 is turned on and there will be current flowing through the trip coil, in which a magnetic field will be generated, and the iron core disposed in the trip coil acts to release a lock clip or latch in the leakage protection socket, awaiting the resetting of the reset button.

By releasing the reset button, the reset button will be reset and the main circuit switches KR2-1, KR2-2 will be switched on, and there will be power output from the power output end LOAD and the power output jack of the leakage detection protection circuit.

In the meanwhile, the dynamic contact rod C of the analog power supply switch KR-2 is disconnected from the first static contact terminal A, and the analog leakage current will disappear; the dynamic contact rod C will contact the second static contact terminal B. The analog power supply switch KR-2 thereby switches to another state, and the analog power supply switch KR-2 is still in the switched-on state. The live wire HOT of the power input end LINE past the induction coil L1 and the self-excitation coil L2 is connected to the null wire WHITE of the power output end LOAD via the trip coil SOL, the SCR V4, and the switched-on analog power supply switch KR-2 to provide working power supply to the control chip IC1, the SCR V4, the rectifier diode V1, the resistor R1, the filter capacitor C3, and the trip coil SOL with built-in iron core, and the leakage detection protection circuit will carry current.

An example of the mechanisms is as follows: Pressing the reset button pushes down the reset arm (a metal rod). The reset arm presses a latch, and the latch moves down. The pressing causes a spring metal piece to make contact with a contact point A on the circuit board, thus closing the switch KR-2. After reset, the latch moves up to connect all conductors, such as KR2-1, KR2-2, and, if used, KR-3. The spring metal piece then makes contact with the contact point B. Connecting with terminal A will generate a simulated fault. Connecting with terminal B indicates that the GFCI is in normal operation.

Figure 4:
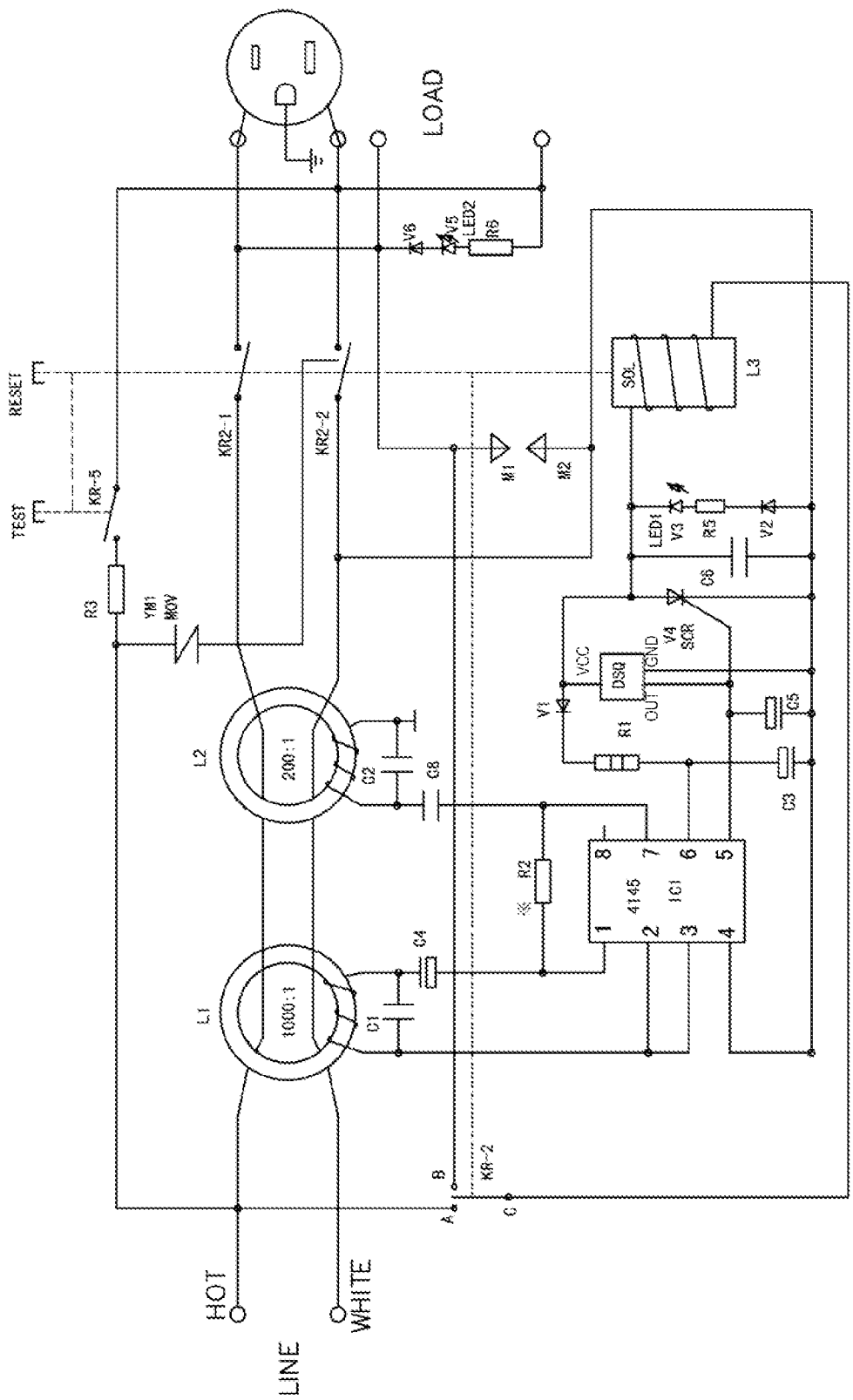
FIG. 4 is a circuit diagram of a leakage detection protection circuit according to the fourth embodiment.
Figure 5:
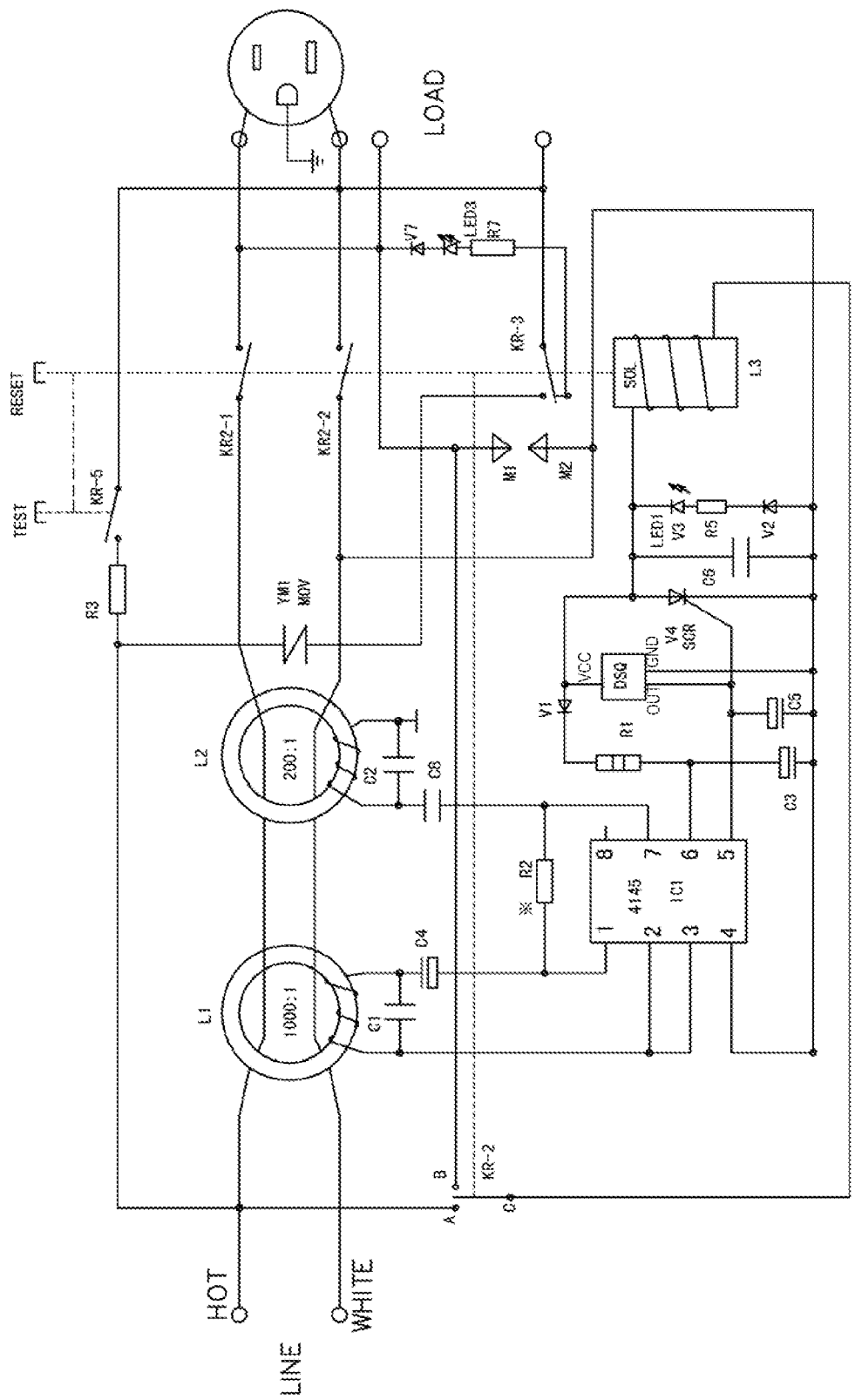
FIG. 5 is a circuit diagram of a leakage detection protection circuit according to the fifth embodiment.
Figure 6:
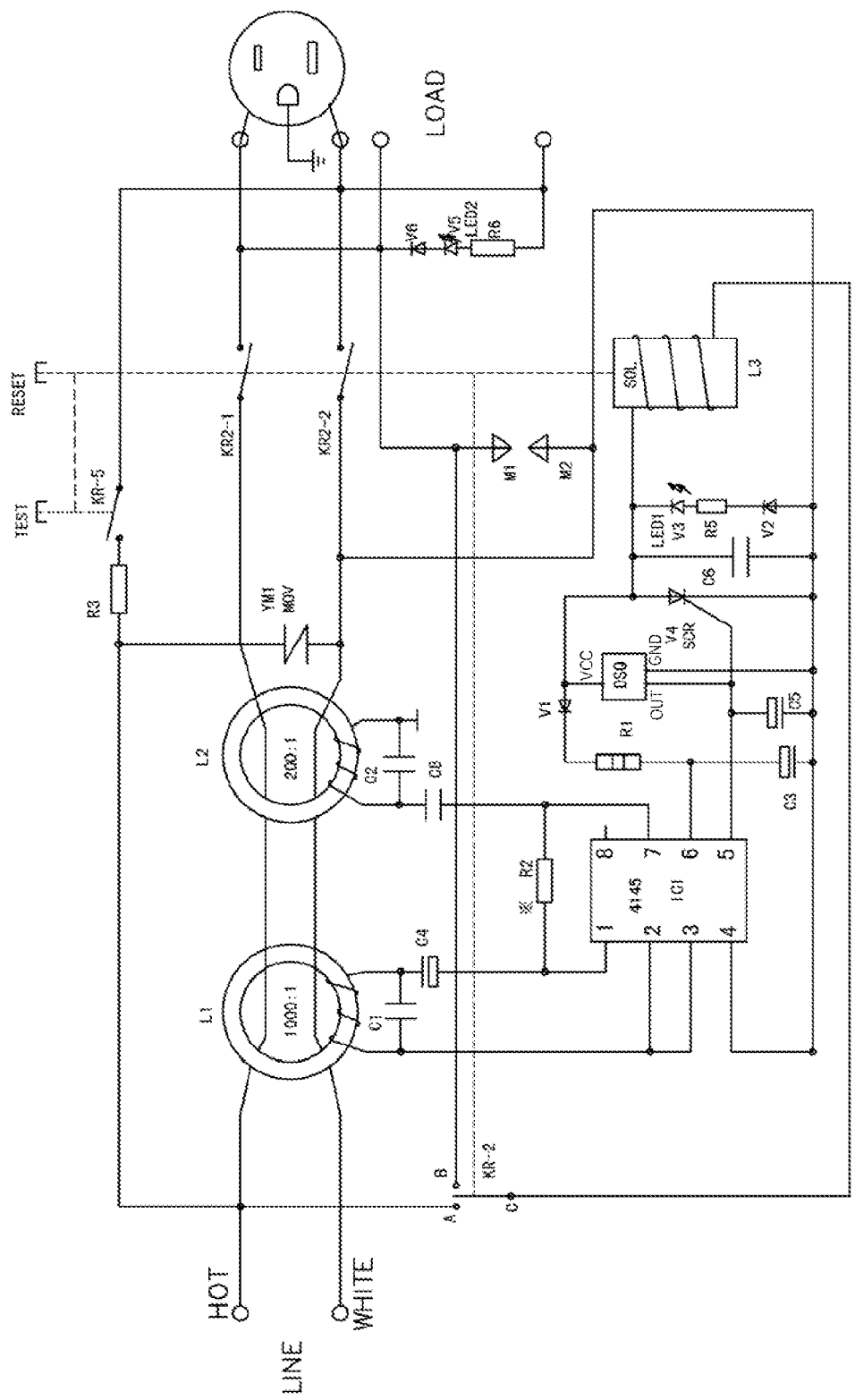
FIG. 6 is a circuit diagram of a leakage detection protection circuit according to the sixth embodiment.

FIGS. 4, 5, and 6 are the circuit diagrams of another group of embodiments of the leakage detection protection circuit. The embodiments shown in FIGS. 4-6 are different from the embodiments shown in FIGS. 1-3 at least as follows:

The first static contact terminal A of the analog power supply switch KR-2 linked with the reset button included in the leakage detection protection circuit shown in FIGS. 4-6 is connected to the live wire HOT of the power input end LINE; the second static contact terminal B of the analog power supply switch KR-2 is connected to the live wire HOT of the power output end LOAD; and the dynamic contact rod C of the analog power supply switch KR-2 is connected to the power input pin 6 of the control chip IC1 via the trip coil SOL, the rectifier diode V1, and the current-limiting resistor R1. The dynamic rod C of the analog power supply switch KR-2 is connected to the anode of the SCR V4 and the power input pin VCC of the timer chip DSQ via the trip coil SOL.

The ground output pin 4 of the control chip IC1, the cathode of the SCR V4, and the ground output pin GND of the timer chip DSQ are connected to the null wire WHITE of the power output end LINE past the induction coil L1 and the self-excitation coil L2.

Though the operation differs, the principles of the leakage detection protection circuit shown in FIGS. 4-6 are identical with those of the leakage detection protection circuit shown in FIGS. 1-3:

When the reset button RESET is in the release state, the analog power supply switch KR-2 will be in the switched-off state, the dynamic contact rod C of the analog power supply switch KR-2 will not contact either the first static contact terminal A or the second static contact terminal B, none of the control chip IC1, the SCR V4, the trip coil SOL, the resistor, the capacitor, and other components in the leakage detection protection circuit will be electrically charged, and the entire leakage detection protection circuit will not carry current and will be in a power-saving state.

When the reset button RESET is pressed, the analog power supply switch KR-2 links with the reset button RESET, the first static contact terminal A of the analog power supply switch KR-2 contacts the dynamic contact rod C, the analog power supply switch KR-2 is switched on, and the live wire HOT of the power input end LINE is connected to the null wire WHITE of the power input end LINE past the induction coil L1 and the self-excitation coil L2 via the trip coil SOL, the LED1, the resistor R5, and the diode V2 to form a closed circuit and generate the analog leakage current.

In the meanwhile, the live wire HOT of the power input end LINE is connected to the null wire WHITE of the power input end LINE past the induction coil L1 and the self-excitation coil L2 via the switched-on analog power supply switch KR-2, the trip coil SOL, and the SCR V4 to provide working power supply to the control chip IC1, the SCR V4, the rectifier diode V1, the resistor R1, the filter capacitor C3, and the trip coil SOL with built-in iron core, and the leakage detection protection circuit will carry current.

If the leakage detection protection circuit is not at the end of its service life and is still having the function of leakage protection, due to the analog leakage current generated in the power supply circuit, the induction coil L1 and the self-excitation coil L2 will send inducted signals to the control chip IC1, the pin 5 of the control chip IC1 will send control signals to turn on the SCR V4 and there will be current flowing through the trip coil, in which a magnetic field will be generated, and the iron core disposed in the trip coil acts to release the lock clip of the leakage protection socket, awaiting the resetting of the reset button.

By releasing the reset button, the reset button RESET will be reset and the main circuit switches KR2-1, KR2-2 will be switched on, and there will be power output from the power output end LOAD and the power output jack of the leakage detection protection circuit. In the meanwhile, the dynamic contact rod C of the analog power supply switch KR-2 is disconnected from the first static contact terminal A, and the analog leakage current will disappear; the dynamic contact rod C will contact the second static contact terminal B, the analog power supply switch KR-2 switches to another state, while the analog power supply switch KR-2 is still in the switched-on state. The power output end of the leakage current protection circuit provides working power supply to the control chip IC1, the SCR V4, the rectifier diode V1, the resistor R1, the filter capacitor C3, and the trip coil SOL with built-in iron core, and the leakage detection protection circuit will carry current.

Figure 7:
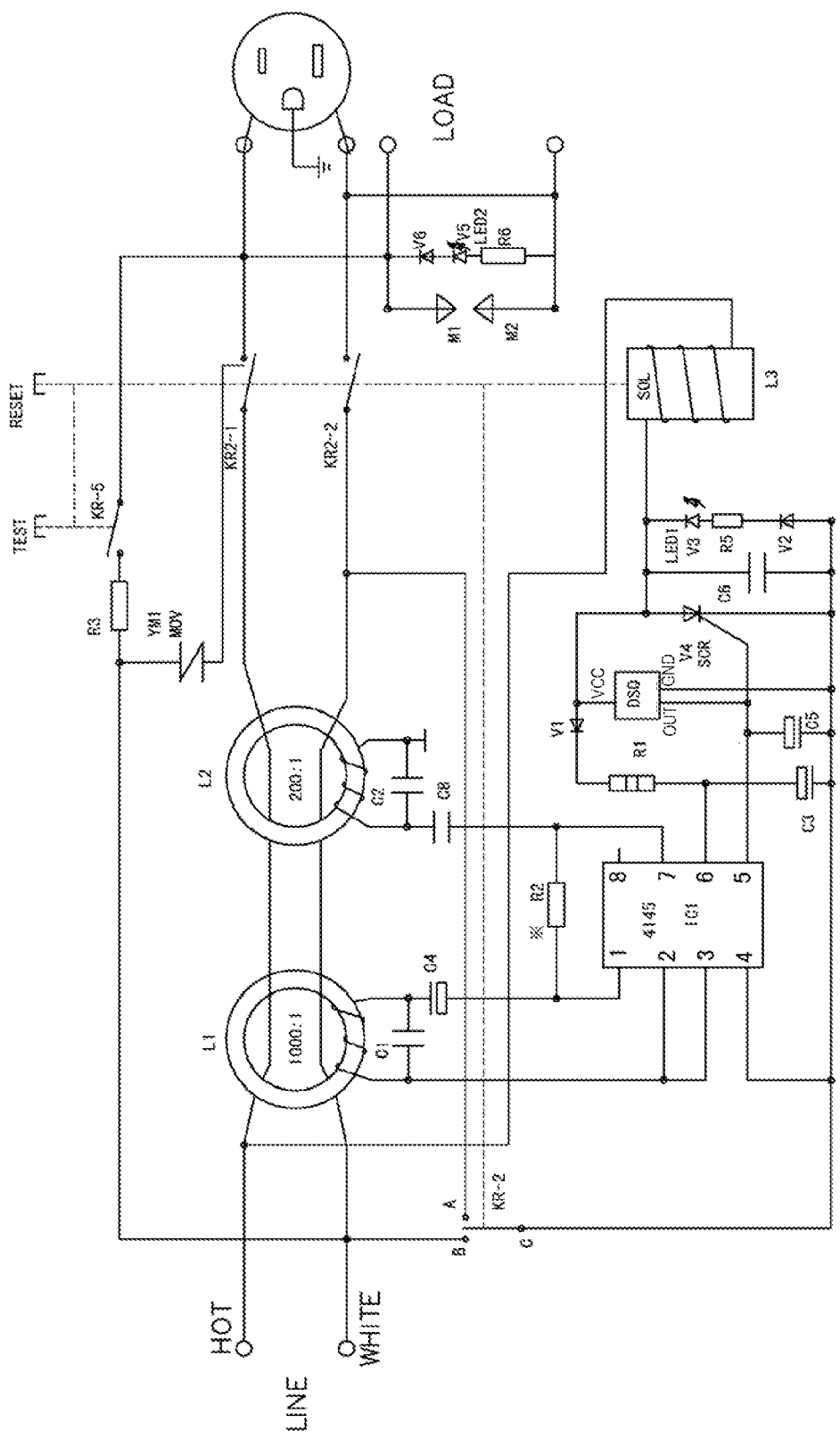
FIG. 7 is a circuit diagram of a leakage detection protection circuit according to the seventh embodiment.

FIG. 7 is the circuit diagram of another embodiment of the leakage detection protection circuit. The embodiment shown in FIG. 7 is different from those shown in FIGS. 1-3 and FIGS. 4-6 at least as follows:

The first static contact terminal A of the analog power supply switch KR-2 linked with the reset button included in the leakage detection protection circuit shown in FIG. 7 is connected to the null wire of the power input end LINE past the induction coil L1 and the self-excitation coil L2; the second static contact terminal B of the analog power supply switch KR-2 is connected to the null wire WHITE of the power input end LINE; and the dynamic contact rod C of the analog power supply switch KR-2 is connected to the ground output pin 4 of the control chip IC1 and the cathode of the SCR V4.

The power input pin 6 of the control chip IC1 is connected to the live wire HOT of the power input end LINE via the current limiting resistor R1, the rectifier diode V1, and the trip coil SOL. The anode of the SCR V4 is connected to the live wire HOT of the power input end LINE via the trip coil SOL. The power input pin VCC of the timer chip DSQ is connected to the live wire HOT of the power input end LINE via the trip coil SOL, and the ground output pin GND of the timer chip DSQ is connected to the dynamic contact rod C of the analog power supply switch KR-2.

When the reset button RESET is in the release state, the analog power supply switch KR-2 will be in the switched-off state, the dynamic contact rod C will not contact either the first static contact terminal or the second static contact terminal B, none of the control chip IC1, the SCR V4, the trip coil SOL, the resistor, the capacitor, and other components in the leakage detection protection circuit will be electrically charged, and the entire leakage detection protection circuit will not carry current and will be in a power-saving state.

When the reset button RESET is pressed, the analog power supply switch KR-2 links with the reset button RESET, the first static contact terminal A of the analog power supply switch KR-2 will contact the dynamic contact rod C, the analog power supply switch KR-2 is switched on, and the live wire HOT of the power input end LINE is connected to the null wire WHITE of the power input end LINE past the induction coil L1 and the self-excitation coil L2 via the trip coil SOL, the LED1, the resistor R5, the diode V2, and the switched-on analog power supply switch KR-2 to form a closed circuit and generate the analog leakage current.

In the meanwhile, the live wire HOT of the power input end LINE is connected to the null wire WHITE of the power input end LINE past the induction coil L1 and the self-excitation coil L2 via the trip soil SOL, the SCR V4 and also the switched-on analog power supply switch KR-2 to provide working power supply to the control chip IC1, the SCR V4, the rectifier diode V1, the resistor R1, the filter capacitor C3, and the trip coil SOL with built-in iron core, and the leakage detection protection circuit will carry current.

If the leakage detection protection circuit is not at the end of its service life and is still having the function of leakage protection, due to the analog leakage current generated in the power supply circuit, the induction coil L1 and the self-excitation coil L2 will send induced signals to the control chip IC1, the pin 5 of the control chip IC1 will send control signals to turn on the SCR V4 and there will be current flowing through the trip coil, in which a magnetic field will be generated, and the iron core disposed in the trip coil acts to release the lock clip of the leakage protection socket, awaiting the resetting of the reset button.

By releasing the reset button, the reset button RESET will be reset and the main circuit switches KR2-1, KR2-2 are switched on, and there will be power output from the power output end LOAD and the power output jack of the leakage detection protection circuit. In the meanwhile, the dynamic contact rod C of the analog power supply switch KR-2 is disconnected from the first static contact terminal A, and the analog leakage current will disappear; and the dynamic contact rod C will contact the second static contact terminal B, the analog power supply switch KR-2 switches to another state, while the analog power supply switch KR-2 is still in the switched-on state. The live wire HOT of the power input end LINE is connected to the null wire WHITE of the power input end LINE via the trip coil SOL, the LED1, the resistor R5, the diode V2, and the switched-on analog power supply switch KR-2 to form a closed circuit, and the power input end of the leakage current protection circuit provides working power supply to the control chip IC1, the SCR V4, the rectifier diode V1, the resistor R1, the filter capacitor C3, and the trip coil SOL with built-in iron core, and the leakage detection protection circuit will carry current.

Figure 8:
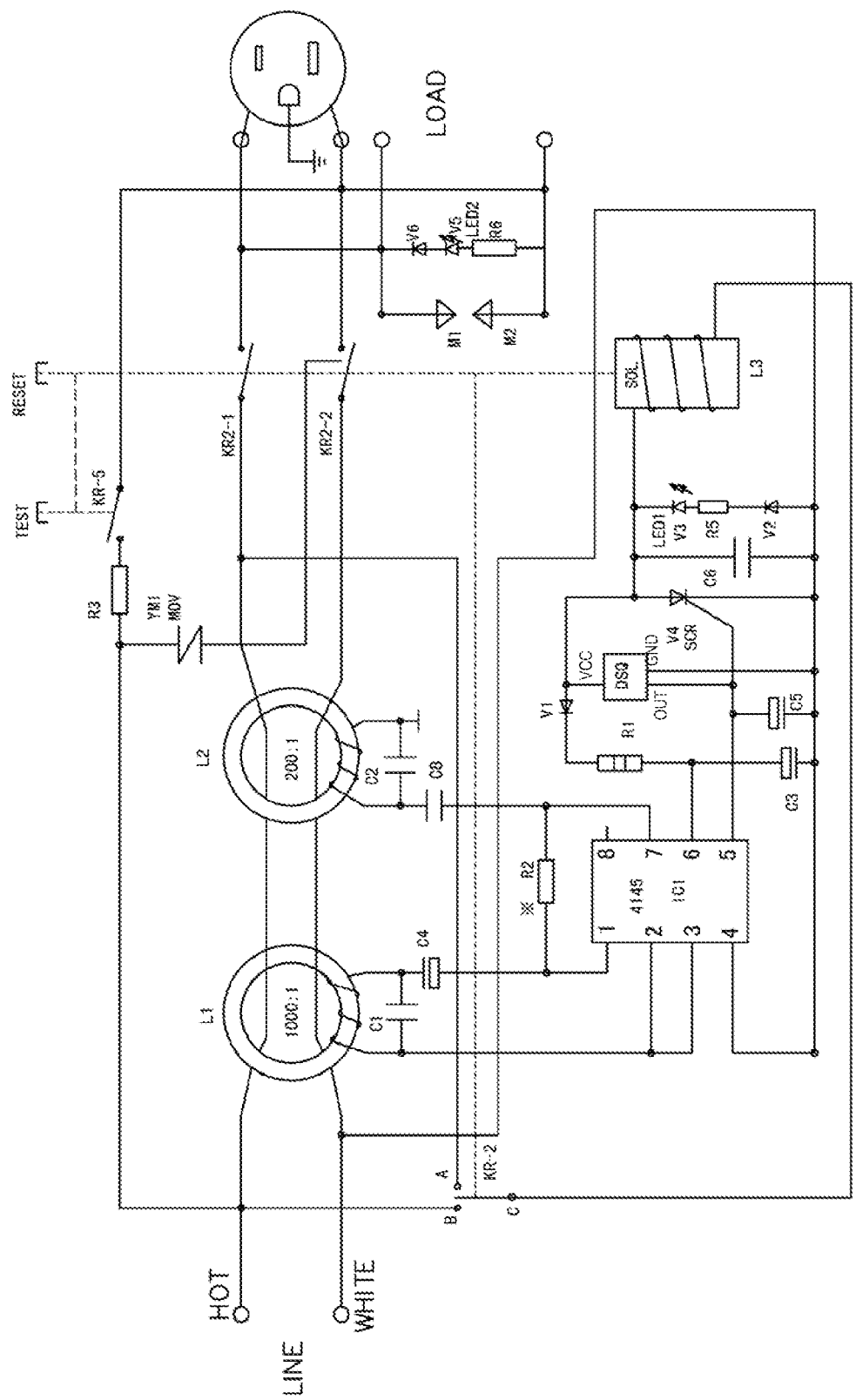
FIG. 8 is a circuit diagram of a leakage detection protection circuit according to the eighth embodiment.

FIG. 8 is the circuit diagram of still another embodiment of the leakage detection protection circuit. Though the operation differs, the principle of the embodiment shown in FIG. 8 is identical with that shown in FIG. 7, and the differences are at least as follows:

The first static contact terminal A of the analog power supply switch KR-2 linked with the reset button included in the leakage detection protection circuit shown in FIG. 7 is connected to the null wire of the power input end LINE past the induction coil L1 and the self-excitation coil L2; the second static contact terminal B of the analog power supply switch KR-2 linked is connected to the null wire WHITE of the power input end LINE; and the dynamic contact rod C of the analog power supply switch KR-2 linked is connected to the ground output pin 4 of the control chip IC1 and the cathode of the SCR V4. The power input pin 6 of the control chip IC1 is connected to the live wire HOT of the power input end LINE via the current limiting resistor R1, the rectifier diode V1, and the trip coil SOL. The anode of the SCR V4 is connected to the live wire HOT of the power input end LINE via the trip coil SOL. The power input pin VCC of the timer chip DSQ is connected to the live wire HOT of the power input end LINE via the trip coil SOL, and the ground output pin GND of the timer chip DSQ is connected to the dynamic contact rod C of the analog power supply switch KR-2.

In contrast, the first static contact terminal A of the analog power supply switch KR-2 linked with the reset button included in the leakage detection protection circuit shown in FIG. 8 is connected to the live wire of the power input end LINE past the induction coil L1 and the self-excitation coil L2; the second static contact terminal B of the analog power supply switch KR-2 linked is connected to the live wire HOT of the power input end LINE; and the dynamic contact rod C of the analog power supply switch KR-2 is connected to the power input pin 6 of the control chip IC1 via the trip coil SOL, the rectifier diode V1, and the current limiting resistor R1; while the dynamic contact rod C of the analog power supply switch KR-2 is connected to the anode of the SCR V4 and the power input pin VCC of the timer chip DSQ via the trip coil SOL. The ground output pin 4 of the control chip IC1, the cathode of the SCR V4, and the ground output pin GND of the timer chip DSQ are connected to the null wire of the power input end.

As shown in FIGS. 3 and 6, the leakage detection protection circuit further comprises a varistor MOV. One end of the varistor MOV is connected to the null or live wire of the power input end LINE, and the other end is connected to the live or null wire of the power input end LINE past the induction coil L1 and the self-excitation coil L2. The varistor has abnormal over-voltage and over-voltage protection function, and can conveniently achieve the abnormal over-voltage and over-voltage protection function as long as the protective voltage value of the varistor is selected in accordance with the over-voltage protective value.

The leakage detection protection circuit shown in FIGS. 1, 4, 7 and 8 also includes one varistor MOV. One end of the varistor MOV is connected to the null or live wire of the power input end LINE, and the other end is connected to the live or null wire of the power output end via the main circuit switch KR2-1 or KR2-2; when the main circuit switch KR2-1, KR2-2 is switched on, the other end of the varistor MOV is connected to the live or null wire of the power output end, and when the main circuit switch KR2-1, KR2-2 is switched off, the other end of the varistor MOV is disconnected from the live or null wire of the power output end. The advantage of this design is as follows: when there occurs an over-current, over-voltage, or other failures in the circuit and the leakage detection protection circuit sends control signals so that the components in the leakage protection socket acts to make the reset button tripped and make the main circuit switches KR2-1, KR2-2 switched off, the varistor is also disconnected from the power supply circuit to avoid the burn of the varistor.

The leakage detection protection circuit shown in FIGS. 2 and 5 also includes one varistor MOV. One end of the varistor MOV is connected to the null or live wire of the power input end LINE, and the other end is connected to the live or null wire of the power output end via a switch KR-3 linked with the reset button. When the reset button RESET is reset, the switch KR-3 is switched on. The other end of the varistor MOV is connected to the live or null wire of the power output end via the switched-on switch KR-3; and when the switch KR-3 is tripped and in the release state, the switch KR-3 is switched off, and the other end of the varistor MOV is disconnected from the live or null wire of the power output end. The advantage of this design is as follows: when there occurs an over-current, over-voltage, or other failures in the circuit and the leakage detection protection circuit sends control signals so that the components in the leakage protection socket acts to make the reset button tripped and make the switch KR-3 switched off, the varistor is also disconnected from the power supply circuit to avoid the burn of the varistor.

As shown in FIGS. 1-6, the leakage detection protection circuit further comprises a pair of discharge metal sheets M1, M2 arranged opposite to each other and spaced from each other. One of the discharge metal sheets is connected to the null or live wire of the power output end, and the other is connected to the live or null wire of the power supply past the induction coil L1 and the self-excitation coil L2.

As shown in FIGS. 7 and 8, the leakage detection protection circuit further comprises a pair of discharge metal sheets M1, M2, which can also be arranged on the power output end.

One of the discharge metal sheets is connected to the live wire of the power output end, and the other is connected to the null wire of the power output end.

In order to timely indicate the working state of the leakage detection protection circuit, as shown in FIGS. 1, 3, 4, 6, 7, and 8, the leakage detection protection circuit further comprises a power output display circuit. The power output display circuit comprises a power output indicator LED2, a diode V6, and a current-limiting resistor R6. After connecting the indicator LED2, the diode V6, and the current-limiting resistor R6 in series, one end is connected to the live wire of the power output end, and the other end is connected to the null wire of the power output end. When there is power output from the power output end of the leakage detection protection circuit, the power output indicator LED2 will light up; otherwise it will not light up.

As shown in FIGS. 2 and 5, the leakage detection protection circuit further comprises a wiring error display circuit. The wiring error display circuit comprises a power output indicator LED3, a diode V7 and a current-limiting resistor R7. After connecting the indicator LED3, the diode V7, and the current-limiting resistor R7 in series, one end is connected to the live wire of the power output end via the switch KR-3 linked with the reset button, and the other end is connected to the null wire of the power output end. When the reset button is in the release state, the switch KR-3 is switched on, and when the reset button is in the reset state, the switch KR-3 is switched off.

When the installation faultily connects the power cable in the wall with the power output end LOAD of the leakage detection protection circuit, as the reset button RESET is in the release state, the switch KR-3 will be in the switched-on state, and the indicator LED3 will light up to indicate the wiring error of the leakage detection protection circuit. Otherwise, when the wiring by installers is correct, even though the reset button RESET is in the release state and the switch KR-3 is in the switched-on state, as the power output end of the leakage detection protection circuit does not carry current, the indicator LED3 will not light up.

As shown in FIGS. 1-3, the leakage detection protection circuit further comprises an analog work indicator circuit. The analog work indicator circuit comprises an indicator LED1, a diode V2, and an analog resistor R5. After connecting the indicator LED1, the diode V2 and the analog resistor R5 in series, one end is connected to the live wire of the power supply past the induction coil L1 and the self-excitation coil L2 via the trip coil SOL, and the other end is connected to the dynamic contact rod C of the analog power supply switch KR-2.

In the embodiments shown in FIGS. 4-6, the analog work indicator circuit also comprises an indicator LED1, a diode V2, and an analog resistor R5. After connecting the indicator LED1, the diode V2, and the analog resistor R5 in series, one end is connected to the dynamic contact rod C of the analog power supply switch KR-2 via the trip coil SOL, and the other end is connected to the null wire of the power supply past the induction coil L1 and the self-excitation coil L2.

In the embodiment shown in FIG. 7, the analog work indicator circuit also comprises an indicator LED1, a diode V2, and an analog resistor R5. After connecting the indicator LED1, the diode V2, and the analog resistor R5 in series, one end is connected to the live wire of the power input end via the trip coil SOL, and the other end is connected to the dynamic contact rod C of the analog power supply switch KR-2.

In the embodiment shown in FIG. 8, the analog work indicator circuit also comprises an indicator LED1, a diode V2, and an analog resistor R5. After connecting the indicator LED1, the diode V2, and the analog resistor R5 in series, one end is connected to the dynamic contact rod C of the analog power supply switch KR-2 via the trip coil SOL, and the other end is connected to the null wire of the power input end.

The analog work indicator circuit has dual functions: 1) when the reset button is pressed, if the leakage detection protection circuit is not at the end of its service life, the analog work indicator circuit will generate analog leakage current, and the indicator LED1 will blink once; if the leakage detection protection circuit is at the end of its service life, the reset button will be prevented from resetting; 2) in the meanwhile, the analog work indicator circuit further has indication and display functions to indicate whether the leakage detection protection circuit is at the end of its service life and whether it can work properly; therefore, the analog work indicator circuit combines two functions, which renders the circuit simpler.

As an additional example, if the device is the end of the life and does not work properly, when the reset button is pressed, the LED1 light can stay on (instead of blinking once). If it is not the end of the life, if the GFCI is not reset, LED1 can also be always on. The indication and display process can be as follows: take the device out of box in a tripped state. Since it is not reset yet, LED1 is not on. If the device is wired correctly, when pressing the reset button, LED1 blinks once. After releasing the reset button and the reset process is successful, LED1 stays on. If the device is in the end of life, when pressing the reset button, LED1 stays on (instead of blinking once). After releasing the reset button, there is no reset and LED1 light is NOT on. If reversed-wired, LED1 is NOT on. With respect to LED2, if reversed-wired, LED2 is always on and the device cannot be reset. If wired correctly and the reset device is reset, LED2 is on. At this time, in normal operation, both LED1 and LED2 are both on. LED1 and LED2 may have different colors, and once both are on, the colors can mix and may turn into a third color. For example, green and red may become another color. The duration of the illumination and the color of the light displays the status and indicates the functionality of the device.

The advantages of the leakage detection protection circuit are:

1. Simple circuit structure and small size.

As the leakage detection protection circuit employs one analog power supply switch to take the place of two switches of the analog leakage current generating switch and the power supply switch in the existing leakage detection protection circuit, it makes the circuit simpler, size is greatly reduced, costs are decreased, and the market competitiveness enhanced.

2. Having abnormal over-voltage protection, and avoiding the burn of the varistor.

One end of the varistor MOV is connected to the null or live wire of the power input end, and the other end is connected to the live or null wire of the power output end. When the reset button RESET is reset, the switch is switched on, and the other end of the varistor is connected to the live or null wire of the power output end via the switched-on switch; when the reset button RESET is tripped and in the release state, the switch is switched off, and the other end of the varistor MOV is disconnected from the live or null wire of the power output end.

That is, when there are over-current, over voltage, or other failures in the circuit, the leakage detection protection circuit will send control signals, so that the components in the leakage protection socket will act, while making the reset button tripped and the switch switched off, to disconnect the varistors from the power supply circuit to avoid the burn of the varistor.

The above description is of the embodiments of the leakage detection protection circuit and the utilized technical principles thereof, and all equivalent modifications based on the technical solutions of the leakage detection protection circuit disclosed, including connecting the other end of the second static contact terminal B shown in FIG. 1 to the power null wire past the induction coil L1 and the self-excitation coil L2, or connecting the other end of the second static contact terminal B shown in FIG. 4 to the power live wire past the induction coil L1 and the self-excitation coil L2, fall within the scope of the teachings.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A leakage detection protection circuit comprising:
   a power input end having a null wire and a live wire;
   a power output end having a null wire and a live wire;
   an induction coil (L1) for detecting leakage current;
   a self-excitation coil (L2) for detecting low-resistance failure;
   a control chip (IC1);
   a silicon controlled rectifier ("SCR") (V4);
   a rectifier diode (V1);
   a resistor (R1);
   a filter capacitor (C3);
   a trip coil (SOL) with built-in iron core;
   main circuit switches (KR2-1, KR2-2) linked with a reset button; and
   at least one single-pole double-throw analog power supply switch (KR-2) linked with the reset button comprising:
      a dynamic contact rod (C);
      a first static contact terminal (A); and
      a second static contact terminal (B),
   wherein:
   when the reset button is in a released state, the analog power supply switch (KR-2) is open, the dynamic contact rod (C) will not contact either the first static contact terminal (A) or the second static contact terminal (B), and the entire leakage detection protection circuit will not carry current,
   at the moment when the reset button is pressed, the analog power supply switch (KR-2) is closed, the dynamic contact rod (C) is electrically connected to the power input end via the first static contact terminal (A) of the analog power supply switch (KR-2) to form a test circuit and generate analog leakage current,
   when the reset button is reset, the dynamic contact rod (C) of the analog power supply switch (KR-2) is disconnected from the first static contact terminal (A), and the generated analog leakage current terminates, and the dynamic contact rod (C) of the analog power supply switch (KR-2) is electrically connected to one of the power output end or the power input end via the second static contact terminal (B) of the analog power supply switch (KR-2), the circuit is configured to provide working power supply to the leakage detection protection circuit.

2. The leakage detection protection circuit according to claim 1, wherein the power input end passes through the induction coil (L1) and the self-excitation coil (L2) before electrically connecting to the first static contact terminal A.

3. The leakage detection protection circuit according to claim 1, wherein:
   the first static contact terminal (A) of the analog power supply switch (KR-2) is electrically connected to one of the null wire or the live wire of the power input end after the induction coil (L1) and the self-excitation coil (L2),
   the second static contact terminal (B) of the analog power supply switch (KR-2) is electrically connected to one of the live wire or the null wire of the power input end,
   the power output end of the control chip (IC1) and the cathode of the SCR (V4) are electrically connected to the dynamic contact rod (C) of the analog power supply switch (KR-2),
   the power input end of the control chip (IC1) and the anode of the SCR (V4) are electrically connected to the live wire of the power input end via the trip coil (SOL),
   the power output end of the control chip (IC1) and the cathode of the SCR (V4) are electrically connected to the null wire of the power input end,
   when the reset button is in the released state, the analog power supply switch (KR-2) is open, the dynamic contact rod (C) does not contact either the first static terminal (A) or the second static terminal (B), and the entire leakage detection protection circuit does not carry current,
   at the moment when the reset button is pressed, the dynamic contact rod (C) of the analog power supply switch (KR-2) is electrically connected to one of the null wire or the live wire of the power input end past the induction coil (L1) and the self-excitation coil (L2) via the first static contact terminal (A) of the analog power supply switch (KR-2) to form a closed test circuit and generate an analog leakage current, and
   after the reset button is reset, the dynamic contact rod (C) of the analog power supply switch (KR-2) is disconnected from the first static contact terminal (A), and the analog leakage current terminates, and the dynamic contact rod (C) of the analog power supply switch (KR-2) is electrically connected to the power input end via the second static contact terminal (B) of the analog power supply switch (KR-2) to provide working power supply to the leakage detection protection circuit.

4. The leakage detection protection circuit according to claim 1, wherein:
   the first static contact terminal (A) of the analog power supply switch (KR-2) is electrically connected to one of the null wire or the live wire of the power input end after the induction coil (L1) and the self-excitation coil (L2),
   the second static contact terminal (B) of the analog power supply switch (KR-2) is electrically connected to one of the live wire or the null wire of the power input end,
   the power input end of the control chip (IC1) and the anode of the SCR (V4) are electrically connected to the dynamic contact rod (C) of the analog power supply switch (KR-2) via the trip coil (SOL), and the power output end of the control chip (IC1) and the cathode of the SCR (V4) are electrically connected to the null wire of the power input end,
   the power output end of the control chip (IC1) and the cathode of the SCR (V4) are electrically connected to the null wire of the power input end,
   when the reset button is in the released state, the analog power supply switch (KR-2) is open, the dynamic contact rod (C) does not contact either the first static terminal (A) or the second static terminal (B), and the entire leakage detection protection circuit does not carry current, at the moment when the reset button is pressed, the dynamic contact rod (C) of the analog power supply switch (KR-2) is electrically connected to one of the null wire or the live wire of the power input end past the induction coil (L1) and the self-excitation coil (L2) via the first static contact terminal (A) of the analog power supply switch (KR-2) to form a closed test circuit and generate an analog leakage current, and after the reset button is reset, the dynamic contact rod (C) of the analog power supply switch (KR-2) is disconnected from the first static contact terminal (A), and the analog leakage current terminates, and the dynamic contact rod (C) of the analog power supply switch (KR-2) is electrically connected to the power input end via the second static contact terminal (B) of the analog power supply switch (KR-2) to provide working power supply to the leakage detection protection circuit.

5. The leakage detection protection circuit according to claim 3, wherein:

the first static contact terminal (A) of the analog power supply switch (KR-2) is electrically connected to the null wire of the power input end past the induction coil (L1) and the self-excitation coil (L2), the second static contact terminal (B) of the analog power supply switch (KR-2) is electrically connected to the null wire of the power input end, the dynamic contact rod (C) of the analog power supply switch (KR-2) is electrically connected to the ground output pin (4) of the control chip (IC1) and the cathode of the SCR (V4) in the leakage detection protection circuit, the power input pin (6) of the control chip (IC1) is electrically connected to the live wire of the power input end via the current limiting resistor (R1), the rectifier diode (V1), and the trip coil (SOL), and the anode of the SCR (V4) is electrically connected to the live wire of the power input end via the trip coil (SOL).

6. The leakage detection protection circuit according to claim 4, wherein:

the first static contact terminal (A) of the analog power supply switch (KR-2) is electrically connected to the null wire of the power input end past the induction coil (L1) and the self-excitation coil (L2), the second static contact terminal (B) of the analog power supply switch (KR-2) is electrically connected to the null wire of the power input end, the dynamic contact rod (C) of the analog power supply switch (KR-2) is electrically connected to the ground output pin (4) of the control chip (IC1) and the cathode of the SCR (V4) in the leakage detection protection circuit, the power input pin (6) of the control chip (IC1) is electrically connected to the live wire of the power input end via the current limiting resistor (R1), the rectifier diode (V1), and the trip coil (SOL), and the anode of the SCR (V4) is electrically connected to the live wire of the power input end via the trip coil (SOL).

7. The leakage detection protection circuit according to claim 3, wherein:

the first static contact terminal (A) of the analog power supply switch (KR-2) is electrically connected to the live wire of the power input end past the induction coil (L1) and the self-excitation coil (L2), the second static contact terminal (B) of the analog power supply switch (KR-2) is electrically connected to the live wire of the power input end, the dynamic contact rod (C) of the analog power supply switch (KR-2) is electrically connected to the ground input pin (6) of the control chip (IC1) via the trip coil (SOL), the rectifier diode (V1), and the current limiting resistor (R1), and the dynamic contact rod (C) of the analog power supply switch (KR-2) is electrically connected to the anode of the SCR (V4) via the trip coil (SOL), and the ground output pin (4) of the control chip (IC1) and the cathode of the SCR (V4) are electrically connected to the null wire of the power input end.

8. The leakage detection protection circuit according to claim 4, wherein:

the first static contact terminal (A) of the analog power supply switch (KR-2) is electrically connected to the live wire of the power input end past the induction coil (L1) and the self-excitation coil (L2), the second static contact terminal (B) of the analog power supply switch (KR-2) is electrically connected to the live wire of the power input end, the dynamic contact rod (C) of the analog power supply switch (KR-2) is electrically connected to the ground input pin (6) of the control chip (IC1) via the trip coil (SOL), the rectifier diode (V1), and the current limiting resistor (R1), and the dynamic contact rod (C) of the analog power supply switch (KR-2) is electrically connected to the anode of the SCR (V4) via the trip coil (SOL), and the ground output pin (4) of the control chip (IC1) and the cathode of the SCR (V4) are electrically connected to the null wire of the power input end.

9. The leakage detection protection circuit according to claim 1, wherein:

the first static contact terminal (A) of the analog power supply switch (KR-2) is electrically connected to one of the null wire or the live wire of the power input end, the second static contact terminal (B) of the analog power supply switch (KR-2) is electrically connected to one of the live wire or the null wire of the power output end, the power output end of the control chip (IC1) and the cathode of the SCR (V4) are electrically connected to the dynamic contact rod (C) of the analog power supply switch (KR-2), the power input end of the control chip (IC1) and the anode of the SCR (V4) are electrically connected to the live wire of the power supply end past the induction coil (L1) and the self-excitation coil (L2) via the trip coil (SOL), the power output end of the control chip (IC1) and the cathode of the SCR (V4) are electrically connected to the null wire of the power supply past the induction coil (L1) and the self-excitation coil (L2), at the moment the reset button is pressed, the analog power supply switch (KR-2) is switched on, the dynamic contact rod (C) of the analog power supply switch (KR-2) will contact the first static contact terminal (A) to form a closed test circuit and generate analog leakage current, and after the reset button is reset, the dynamic contact rod (C) of the analog power supply switch (KR-2) is electrically connected to the power output end via the second static contact terminal (B) of the analog power supply switch (KR-2) to provide working power supply to the leakage detection protection circuit.

10. The leakage detection protection circuit according to claim 1, wherein:
the first static contact terminal (A) of the analog power supply switch (KR-2) is electrically connected to one of the null wire or the live wire of the power input end,
the second static contact terminal (B) of the analog power supply switch (KR-2) is electrically connected to one of the live wire or the null wire of the power output end,
the power output end of the control chip (IC1) and the cathode of the SCR (V4) are electrically connected to the dynamic contact rod (C) of the analog power supply switch (KR-2),
the power input end of the control chip (IC1) and the anode of the SCR (V4) are electrically connected to the dynamic contact rod (C) of the analog power supply switch (KR-2) via the trip coil (SOL),
the power output end of the control chip (IC1) and the cathode of the SCR (V4) are electrically connected to the null wire of the power supply past the induction coil (L1) and the self-excitation coil (L2),
at the moment the reset button is pressed, the analog power supply switch (KR-2) is switched on, the dynamic contact rod (C) of the analog power supply switch (KR-2) will contact the first static contact terminal (A) to form a closed test circuit and generate analog leakage current, and
after the reset button is reset, the dynamic contact rod (C) of the analog power supply switch (KR-2) is electrically connected to the power output end via the second static contact terminal (B) of the analog power supply switch (KR-2) to provide working power supply to the leakage detection protection circuit.

11. The leakage detection protection circuit according to claim 9, wherein:
the first static contact terminal (A) of the analog power supply switch (KR-2) is electrically connected to the null wire of the power input end,
the second static contact terminal (B) of the analog power supply switch (KR-2) is electrically connected to the null wire of the power output end,
the dynamic contact terminal (C) of the analog power supply switch (KR-2) is electrically connected to the ground output pin (4) of the control chip (IC1) and the cathode of the SCR (V4) in the leakage detection protection circuit,
the power input pin (6) of the control chip (IC1) is electrically connected to the live wire of the power input end past the induction coil (L1) and the self-excitation coil (L2) via the current limiting resistor (R1), the rectifier diode (V1), and the trip coil (SOL), and
the anode of the SCR (V4) in the leakage detection protection circuit is electrically connected to the live wire of the power input end past the induction coil (L1) and the self-excitation coil (L2) via the trip coil (SOL).

12. The leakage detection protection circuit according to claim 10, wherein:
the first static contact terminal (A) of the analog power supply switch (KR-2) is electrically connected to the null wire of the power input end,
the second static contact terminal (B) of the analog power supply switch (KR-2) is electrically connected to the null wire of the power output end,
the dynamic contact rod (C) of the analog power supply switch (KR-2) is electrically connected to the ground output pin (4) of the control chip (IC1) and the cathode of the SCR (V4) in the leakage detection protection circuit,
the power input pin (6) of the control chip (IC1) is electrically connected to the live wire of the power input end past the induction coil (L1) and the self-excitation coil (L2) via the current limiting resistor (R1), the rectifier diode (V1), and the trip coil (SOL), and
the anode of the SCR (V4) in the leakage detection protection circuit is electrically connected to the live wire of the power input end past the induction coil (L1) and the self-excitation coil (L2) via the trip coil (SOL).

13. The leakage detection protection circuit according to claim 9, wherein:
the first static contact terminal (A) of the analog power supply switch (KR-2) is electrically connected to the live wire of the power input end,
the second static contact terminal (B) of the analog power supply switch (KR-2) is electrically connected to the live wire of the power output end,
the dynamic contact rod (C) of the analog power supply switch (KR-2) is electrically connected to the power input pin (6) of the control chip (IC1) via the trip coil (SOL), the rectifier diode (V1), and the current limiting resistor (R1), and the dynamic contact rod (C) of the analog power supply switch (KR-2) is electrically connected to the anode of the SCR (V4) via the trip coil (SOL), and
the ground output pin (4) of the control chip (IC1) and the cathode of the SCR (V4) are electrically connected to the null wire of the power input end past the induction coil (L1) and the self-excitation coil (L2).

14. The leakage detection protection circuit according to claim 10, wherein:
the first static contact terminal (A) of the analog power supply switch (KR-2) is electrically connected to the live wire of the power input end,
the second static contact terminal (B) of the analog power supply switch (KR-2) is electrically connected to the live wire of the power output end,
the dynamic contact rod (C) of the analog power supply switch (KR-2) is electrically connected to the power input pin (6) of the control chip (IC1) via the trip coil (SOL), the rectifier diode (V1), and the current limiting resistor (R1), and the dynamic contact rod (C) of the analog power supply switch (KR-2) is electrically connected to the anode of the SCR (V4) via the trip coil (SOL), and
the ground output pin (4) of the control chip (IC1) and the cathode of the SCR (V4) are electrically connected to the null wire of the power input end past the induction coil (L1) and the self-excitation coil (L2).

15. The leakage detection protection circuit according to claim 1, further comprising a timer chip (DSQ) comprising:
a power input pin (VCC) electrically connected to the live wire (HOT) of the power input end (LINE) past the induction coil (L1) and the self-excitation coil (L2) via the trip coil (SOL); and
a ground output pin (GND) electrically connected to the dynamic contact rod (C) of the analog power supply switch (KR-2).

16. The leakage detection protection circuit according to claim 1, further comprising a timer chip (DSQ), comprising:
a power input pin (VCC) electrically connected to the dynamic contact rod (C) of the analog power supply switch (KR-2) via the trip coil (SOL); and
a ground output pin (GND) electrically connected to the null wire of the power input end (LINE) past the induction coil (L1) and the self-excitation coil (L2).

17. The leakage detection protection circuit according to claim 5, further comprising a timer chip (DSQ), comprising:
- a power input pin (VCC) electrically connected to the live wire of the power input end via the trip coil (SOL); and
- a ground output pin (GND) electrically connected to the dynamic contact rod (C) of the analog power supply switch (KR-2).

18. The leakage detection protection circuit according to claim 6, further comprising a timer chip (DSQ), comprising:
- a power input pin (VCC) electrically connected to the live wire of the power input end via the trip coil (SOL); and
- a ground output pin (GND) electrically connected to the dynamic contact rod (C) of the analog power supply switch (KR-2).

19. The leakage detection protection circuit according to claim 7, further comprising a timer chip (DSQ), comprising:
- a power input pin (VCC) electrically connected to the dynamic contact rod (C) of the analog power supply switch (KR-2) via the trip coil (SOL); and
- a ground output pin (GND) electrically connected to the null wire of the power input end.

20. The leakage detection protection circuit according to claim 8, further comprising a timer chip (DSQ), comprising:
- a power input pin (VCC) electrically connected to the dynamic contact rod (C) of the analog power supply switch (KR-2) via the trip coil (SOL); and
- a ground output pin (GND) electrically connected to the null wire of the power input end.

21. The leakage detection protection circuit according to claim 1, further comprising a generation analog leakage current display circuit comprising a work indicator (LED1), a diode, and a current-limiting resistor electrically connected in series, wherein one end of the generation analog leakage current display circuit is electrically connected to the dynamic contact rod (C) of the analog power supply switch (KR-2).

22. The leakage detection protection circuit according to claim 1, further comprising a varistor (MOV), one end of the varistor (MOV) is electrically connected to the null wire of the power input end, and a second end of the varistor is electrically connected to the live wire of the power input end past the induction coil (L1) and the self-excitation coil (L2).

23. The leakage detection protection circuit according to claim 1, further comprising a varistor (MOV), one end of the varistor (MOV) is electrically connected to the live wire of the power input end, and a second end of the varistor is electrically connected to the null wire of the power input end past the induction coil (L1) and the self-excitation coil (L2).

24. The leakage detection protection circuit according to claim 1, further comprising a varistor (MOV), wherein:
- one end of the varistor (MOV) is electrically connected to the null wire of the power input end, and a second end is electrically connected to the live wire of the power output end via one of the main circuit switches,
- when the one main circuit switch is closed, the second end of the varistor (MOV) is electrically connected to the live wire of the power output end via the closed one main circuit switch, and
- when the main circuit switch (KR2-1, KR2-2) is open, the second end of the varistor (MOV) is disconnected from the live wire of the power output end.

25. The leakage detection protection circuit according to claim 1, further comprising a varistor (MOV), wherein:
- one end of the varistor (MOV) is electrically connected to the live wire of the power input end, and a second end is electrically connected to the null wire of the power output end via one of the main circuit switches,
- when the one main circuit switch is closed, the second end of the varistor (MOV) is electrically connected to the null wire of the power output end via the closed one main circuit switch, and
- when the main circuit switch (KR2-1, KR2-2) is open, the second end of the varistor (MOV) is disconnected from the null wire of the power output end.

26. The leakage detection protection circuit according to claim 1, further comprising:
- a varistor (MOV); and
- a switch (KR-3) linked with the reset button,
wherein:
- one end of the varistor (MOV) is electrically connected to the null wire of the power input end, and a second end is electrically connected to the live wire of the power output end via the switch (KR-3) linked with the reset button, and
- when the reset button is reset, the switch (KR-3) linked with the reset button is closed, and the second end of the varistor (MOV) is electrically connected to the live wire of the power output end via the closed switch (KR3), and
- when the reset button (RESET) is tripped and in the released state, the switch (KR3) linked with the reset button is open, and the second end of the varistor (MOV) is disconnected from the live wire of the power output end.

27. The leakage detection protection circuit according to claim 1, further comprising:
- a varistor (MOV); and
- a switch (KR-3) linked with the reset button,
wherein:
- one end of the varistor (MOV) is electrically connected to the live wire of the power input end, and a second end is electrically connected to the null wire of the power output end via the switch (KR-3), and
- when the reset button is reset, the switch (KR-3) linked with the reset button is closed, and the second end of the varistor (MOV) is electrically connected to the null wire of the power output end via the closed switch (KR3), and
- when the reset button (RESET) is tripped and in the released state, the switch (KR3) linked with the reset button is open, and the second end of the varistor (MOV) is disconnected from the null wire of the power output end.

28. The leakage detection protection circuit according to claim 1, further comprising a pair of discharge metal sheets arranged opposite to each other and spaced from each other, wherein one of the discharge metal sheets is electrically connected to the null wire of the power output end, and the other discharge metal sheet is electrically connected to the live wire of the power supply end after the power supply end has passed through the induction coil (L1) and the self-excitation coil (L2).

29. The leakage detection protection circuit according to claim 1, further comprising a pair of discharge metal sheets arranged opposite to each other and spaced from each other, wherein one of the discharge metal sheets is electrically connected to the live wire of the power output end, and the other discharge metal sheet is electrically connected to the null wire of the power supply end after the power supply end has passed through the induction coil (L1) and the self-excitation coil (L2).

30. The leakage detection protection circuit according to claim 1, further comprising a pair of discharge metal sheets arranged opposite to each other and spaced from each other, wherein one of the discharge metal sheets is electrically connected to the null wire of the power output end, and the other discharge metal sheet is electrically connected to the live wire of the power output end.

31. The leakage detection protection circuit according to claim 1, further comprises a wiring error display circuit, comprising an indicator, a diode, and a current-limiting resistor connected in series,
wherein:
one end of the wiring error display circuit is electrically connected to the live wire of the power output end via a switch (KR-3) linked with the reset button, and the other end of the wiring error display circuit is electrically connected to the null wire of the power output end,
when the reset button is in the released state, the switch (KR-3) linked with the reset button is closed, and
when the reset button is in the reset state, the switch (KR-3) linked with the reset button is open.

32. The leakage detection protection circuit according to claim 1, further comprising an analog work indicator circuit comprising an indicator (LED1), a diode (V2), and an analog resistor (R5) connected in series,
wherein:
one end of the analog work indicator circuit is electrically connected to the live wire of the power supply end passed through the induction coil (L1) and the self-excitation coil (L2) via the trip coil (SOL), and
a second end of the analog work indicator circuit is electrically connected to the dynamic contact rod (C) of the analog power supply switch (KR-2).

33. The leakage detection protection circuit according to claim 1, further comprising an analog work indicator circuit comprising an indicator (LED1), a diode (V2), and an analog resistor (R5) connected in series,
wherein:
one end of the analog work indicator circuit is electrically connected to the dynamic contact rod (C) of the analog power supply switch (KR-2) via the trip coil (SOL), and
a second end of the analog work indicator circuit is electrically connected to the null wire of the power supply end passed through the induction coil (L1) and the self-excitation coil (L2).

34. The leakage detection protection circuit according to claim 1, further comprising an analog work indicator circuit comprising an indicator (LED1), a diode (V2), and an analog resistor (R5) connected in series,
wherein:
one end of the analog work indicator circuit is electrically connected to the live wire of the power input end via the trip coil (SOL), and
a second end of the analog work indicator circuit is electrically connected to the dynamic contact rod (C) of the analog power supply switch (KR-2).

35. The leakage detection protection circuit according to claim 1, further comprising an analog work indicator circuit comprising an indicator (LED1), a diode (V2), and an analog resistor (R5) connected in series,
wherein:
one end of the analog work indicator circuit is electrically connected to the dynamic contact rod (C) of the analog power supply switch (KR-2) via the trip coil (SOL), and
a second end of the analog work indicator circuit is electrically connected to the null wire of the power input end.

36. The leakage detection protection circuit according to claim 1, further comprising an analog work indicator circuit comprising an indicator (LED1),
wherein:
when the reset button is pressed, if the leakage detection protection circuit is not at the end of its service life, the analog work indicator circuit will generate an analog leakage current, and the indicator (LED1) will illuminate,
if the leakage detection protection circuit is at the end of its service life, when the reset button is pressed, the reset button cannot reset.

37. A leakage detection protection circuit comprising:
a power input end having a null wire and a live wire;
a power output end having a null wire and a live wire;
an induction coil (L1) for detecting leakage current;
a self-excitation coil (L2) for detecting low-resistance failure;
a control chip (IC1);
a silicon controlled rectifier ("SCR") (V4);
a rectifier diode (V1);
a resistor (R1);
a filter capacitor (C3);
a trip coil (SOL) with built-in iron core;
main circuit switches (KR2-1, KR2-2) linked with a reset button; and
at least one single-pole double-throw analog power supply switch (KR-2) linked with the reset button comprising:
a dynamic contact rod (C);
a first static contact terminal (A); and
a second static contact terminal (B),
wherein:
when the leakage detection protection circuit is in a tripped state, the analog power supply switch (KR-2) is open, the dynamic contact rod (C) will not contact either the first static contact terminal (A) or the second static contact terminal (B), and the entire leakage detection protection circuit will not carry current.

* * * * *